Jan. 30, 1940.  B. E. CUMMINGS  2,188,832
LATHE
Filed June 30, 1938  2 Sheets-Sheet 1
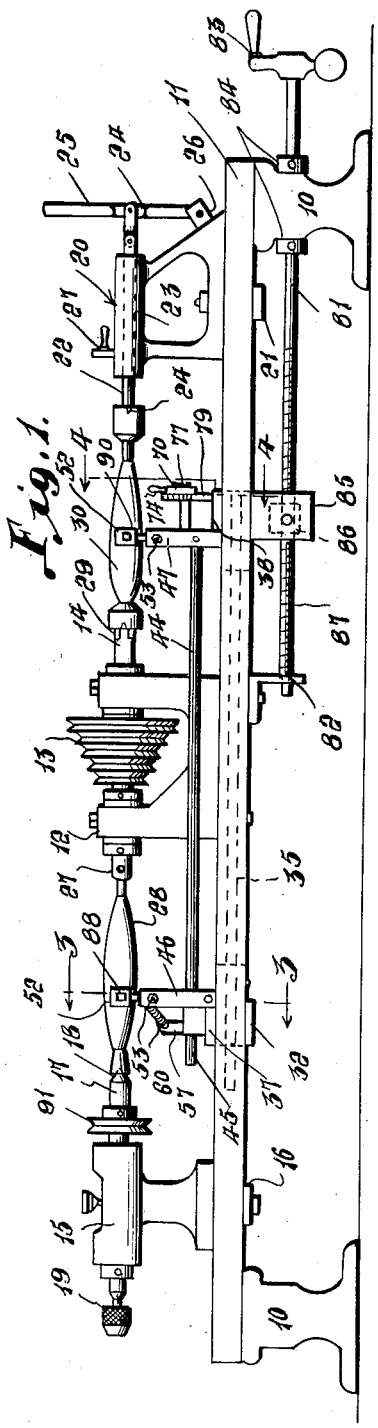
Inventor
B. E. Cummings
By L. F. Randreth
Attorney Inventor
B. E. Cummings Patented Jan. 30, 1940

2,188,832

UNITED STATES PATENT OFFICE 2,188,832

LATHE

Bernard E. Cummings, Orlando, Fla.

Application June 30, 1938, Serial No. 216,793

7 Claims. (Cl. 142—7)

This invention relates to an improved lathe adapted to rotatably mount a model and the material to be turned for cutting the material to correspond to the model.

More particularly, it is an object of this invention to provide an improved construction of guide means and cutter means adapted to be adjustably positioned and connected for imparting transverse movement to the cutter relatively to the material being turned from the guide to cause said material to be cut to correspond to a model with which the guide is in engagement.

More particularly, it is an object of this invention to provide a lathe having a headstock mounted intermediate of its ends and tailstocks adjustably mounted at opposite ends of said headstock to cooperate therewith in rotatably supporting models and pieces of material to be turned of various sizes and lengths.

Still a further object of the invention, is to provide a carriage formed of longitudinally adjustable sections slidably mounted on the ways of said lathe for pivotally and adjustably supporting a follower and cutter which are adjustably connected to each other to move as a unit.

Other objects and advantages of the invention will hereinafter become more fully apparent from the following description of the drawings, which illustrate a preferred form thereof, and wherein—

Figure 1 is a side elevational view of the lathe,

Figure 2 is a top plan view of the carriage,

Figure 3:
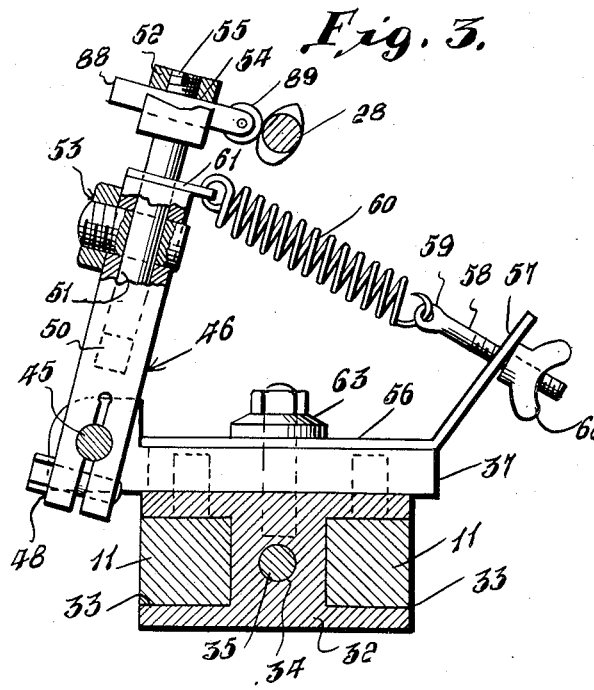
Figure 4:
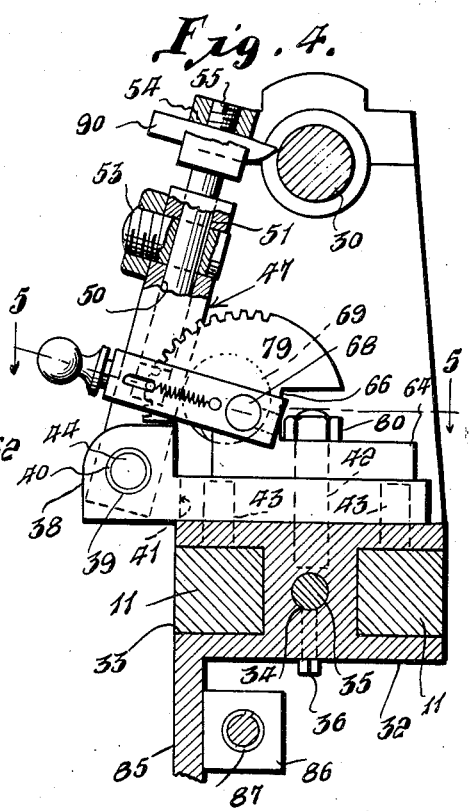
Figure 5:
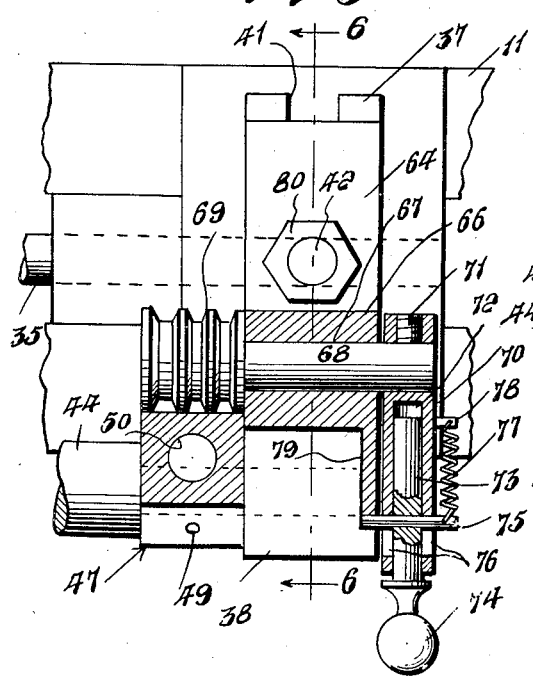
Figure 6:
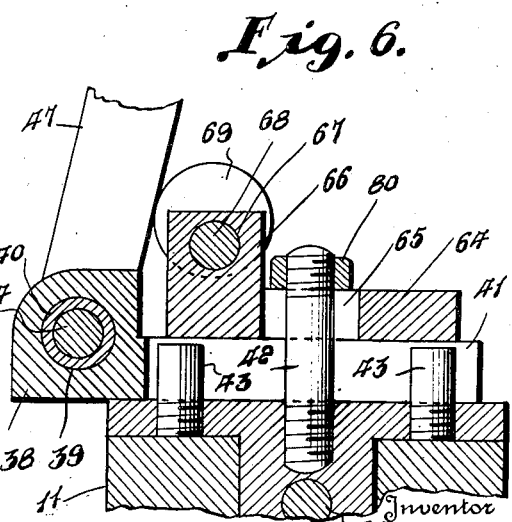

Figure 3 is a transverse vertical sectional view taken on the line 3—3 of Figure 1, Figure 4 is a corresponding view taken on the line 4—4 of Figure 1, Figure 5 is a horizontal sectional view taken on the line 5—5 of Figure 4, and Figure 6 is a vertical sectional view taken on the line 6—6 of Figure 5.

Referring more particularly to the drawings wherein like reference characters designate like or corresponding parts throughout the different views, 10 designates the pedestals on which are mounted the parallel ways 11 intermediate the ends of which is mounted the headstock 12 having a cone pulley 13 keyed to the spindle 14 which is journaled in the opposite ends of the headstock 12.

Slidably mounted on the ways 11 adjacent one end of the lathe is the tailstock 15 having the clamping nut 16 for adjustably positioning it relatievly to one end of the spindle 14. Tailstock 15 is provided with the upper bearing portion in which is journaled the spindle 17 having an idle center 18 at one end and a drill chuck 19 at its opposite end.

Slidably mounted on the ways 11 at the opposite end of the lathe, is the tailstock 20 having clamping means 21 engaging the ways to adjustably position it relatively to the opposite end of the spindle 14. A rod 22 is reciprocally mounted in the upper sleeve portion 23 of the tailstock 20, and is provided with a dead center 24 at one end. The opposite end of the rod 22 is pivotally connected to a link 24 which is pivotally connected intermediate of the ends of a lever 25, which in turn is pivotally connected at its lower end to the fulcrum 26 for actuating the rod 22 relatively to the sleeve 23. A set screw 27 is mounted in sleeve 23 substantially at right angles to the rod 22 and is adapted to be tightened to engage rod 22 to clamp it against movement relatively to the tailstock 20.

Spindle 14 is provided at one end with a chuck or lock 27 in which one end of a model 28 is adapted to be clamped, with the opposite end of the model 28 mounted on the center 18 of the spindle 17. The opposite end of the spindle 14 is preferably provided with a spur center 29 to engage an end of the material to be turned, designated 30, the opposite end of which is mounted on the dead center 24.

As best seen in Figures 2, 3 and 4, a carriage designated generally 31 is mounted on the ways 11, and includes the corresponding blocks 32 having the slots 33 in their opposite ends adapted to slidably engage the ways 11, and the transverse bores 34 in which is positioned the rod 35, which connects the blocks 32 and combines therewith to form the carriage 31. Rod 35 is preferably secured rigidly in the bore 34 of the block 32 seen in Figure 3, and slidably mounted in the bore 34 of the block 32 seen in Figure 4 to adjustably position the blocks relatively to each other. The block 32 as seen in Figure 4, is provided with the set screw 36 adapted to project into the bore 34 to secure the rod 35 therein, when proper adjustment has been made.

Adapted to be mounted on the top face of the blocks 32, are the bearing supports 37 having the enlarged ends 38 provided with the transverse openings 39 adapted to receive the bushings 40, and the longitudinally disposed slots 41, as best seen in Figure 6, which extend from adjacent the heads 38 through the opposite ends of the supports 37. Blocks 32 are provided with the upwardly extending threaded bolts 42 and the dowels 43 positioned on either side and in alignment with the bolts 42 and adapted to engage the slots 41 to slidably position the supports 37 on the blocks 32. A shaft 44 is provided with the reduced opposite ends 45 which are journaled in the bushings 40, and which are adapted to adjustably mount the arms designated generally 46 and 47 which are mounted between the heads 38 and the enlarged portion of the shaft 44, as best seen in Figures 2 and 5.

Arm 46, as seen in Figure 3, is provided with a slot and screw means designated generally 48, for adjustably clamping the arm 46 to its end 45, and the arm 47, as seen in Figure 5 is provided with a set screw 49 for adjustably securing it to the opposite restricted end 45. The arms 46 and 47 are provided with the bores 50 opening outwardly of their upper ends and adapted to receive the shanks 51 of the heads 52 which are adjustably positioned relatively to the arms 46 and 47 by the clamping inserts and nuts, designated 53. The heads 52 are provided with the bores 54 and with the set screws 55 communicating therewith, for a purpose which will hereinafter be more fully described. The block 32 on which the arm 46 is mounted, is provided with a perch 56 which rests on the bearing support 37 and which is provided with an opening, not shown, to receive the bolt 42. Perch 56 is provided with an upwardly extending end 57 having an opening to receive a screw 58 which is provided at one end with an eyelet 59 to which is connected one end of a contractile coil spring 60, the opposite end of which is connected to a ring 61 mounted on the shank 51 carried by the arm 46. A nut 62 is mounted on the screw 58, on the opposite side of the end 57 to the spring 60, and is adapted to be turned to adjust the tension of spring 60. A nut and washer 63 are connected to the upper threaded end of the bolt 42 to clamp perch 56 and support 37 to the block 32.

Mounted on the other bearing support 37, as best seen in Figures 4, 5 and 6, is the base member 64 having the slot 65 through which the bolt 42 extends, and the enlarged end 66 having a bore 67 to journal the reduced shank 68 of the cam 69, the face of which is grooved, as seen in Figure 5. A lever, designated generally 70, is secured to the free end of the shank 68 by the set screw 71 and is provided with the bore 72, opening outwardly of its free end, and adapted to receive the insert 73 having the knob 74 on its outer end. Insert 73 is adjustably retained in the bore 72 by the pin 75 which extends therethrough and which has its opposite ends projecting through the slot 76. Connected to one end of the pin 75 is a contractile coil spring 77, the opposite end of which is connected to a lug 78 on the lever 70 to normally urge the insert 73 inwardly of the bore 72. End 66 is provided with a segmental rack 79 the teeth of which are adapted to be selectively engaged by the pin 75 to form therewith a latch for adjustably retaining the cam 69 relatively to the arm 47. The bearing support 37 and the base member 64 are adjustably positioned relatively to each other and to the block 32 by means of the nut 80 which engages the upper threaded end of the bolt 42, as best seen in Figure 6.

A lead screw 81, is journaled at one end in the depending bearing member 82, and adjacent its opposite end in one of the pedestals 10, and is provided with a crank handle 83 on its last mentioned end. Screw 81 is held relatively to the pedestal 10 and the bearing member 82 by the thrust collars 84. One of the blocks 32 is provided with a depending arm 85 to carry the lead screw nut 86 which is adapted to engage the threaded portion 87 of the lead screw 81 to move the carriage 31 relatively to the ways 11 when the crank 83 is turned.

A guide member 88 is adapted to be adjustably held in the slot 54 of the arm 46, and is provided with a roller 89 adapted to be held in engagement with the model 28 by the spring 60. A cutting bit 90 is adapted to be adjustably mounted in the slot 54 of the arm 47 with its cutting edge in engagement with the material 30.

From the foregoing it will be seen, that the model 28 and material 30 are connected to the spindle 14 by the live centers 27 and 28, respectively, to be revolved at a uniform speed when the pulley 13 is driven, by any suitable means, not shown. The carriage 31 is adjusted longitudinally so that the arms 46 and 47 are relatively disposed to the model 28 and the work 30, respectively. Arms 46 and 47 are then adjusted relatively to each other on the shaft 44, after which crank 83 is moved until the roller 89 is in engagement with the outer end of the model 28, after which nut 62 is adjusted to properly tension the roller 89 on the model. The model and work is then revolved and the roller 89 in following the contour of the model 28 will cause the cutter 90 to move uniformly with the guide 88 to cut the work 30 into a shape corresponding to the model 28, as the carriage, actuated by the lead screw 81 moves the arms 46 and 47 relatively to the model 28 and the work 30, respectively. The cam 69 is adjusted relatively to the arm 47 by means of the rack 79 and pin 75 to limit the inward movement of the cutter 90. The lathe as illustrated is adapted to work and models of various sizes by adjusting the tailstocks 15 and 20 relatively to the headstock 12.

The spindle 17 is provided with a pulley 91 adapted to drive the chuck 19, which may be used to support a drill, not shown, when the device is not being employed as a lathe.

Various modifications and changes in the construction and arrangement of the parts forming the invention may obviously be made and are contemplated, as the tool as shown is only intended to illustrate a preferred form of the invention, and the right is therefore expressly reserved to make such variations and changes as do not depart from the spirit and scope of the invention as hereinafter defined by the appended claims.

I claim as my invention:

1. A lathe comprising means adapted to support a model and material to be turned and to rotate said members at a uniform speed, a carriage slidably mounted relatively to the model and material, a guide pivotally mounted on said carriage and adapted to engage and follow the contour of said model, a cutter pivotally mounted on said carriage and adapted to engage the material, means connecting said guide and cutter to cause them to move as a unit, a contractile spring connected to said guide for urging it into engagement with the model, and a cam associated with said cutter for limiting its cutting depth.

2. A lathe comprising a bed having spaced ways, means carried by the bed for mounting a model and material to be turned and for rotating said parts at a uniform speed, a carriage having slots for slidably engaging the ways, for slidably mounting the carriage relatively to the model and material, said carriage including spaced sections, a rod fixed to one of said sections, means for adjustably securing the rod to the other section for adjustably positioning the sections relatively to each other; a shaft journaled in said sections, arms fixed to said shaft and pivotally mounted thereby relatively to the sections, a guide member carried by one of said arms, spring means for urging the guide member into engagement with the model, a cutter carried by the other arm for engaging the material, said arms being connected by the shaft and movable thereby as a unit.

3. A device as in claim 2, a cam positioned to engage said cutter arm, and latch means connected to said cam to retain it in adjusted position to limit the cutting depth of said cutter.

4. In a lathe, a support including ways, means carried by said support for supporting a model and material to be turned and for rotating the parts, a carriage comprising members having slots for slidably engaging said ways, a rod, set screws for connecting the rod to said members to adjustably position them relatively to each other; bearing members mounted on said slotted members, a rod journaled in said bearing members, arms having means for adjustably securing them to said last mentioned rod, spring means normally urging one of said arms to a projected position, said arms being provided with means to support a guide member and cutting blade adapted to engage the model and material, respectively.

5. A device as in claim 4, comprising a bearing carried by one of said slotted members, a shaft journaled said bearing a cam keyed to said shaft for engagement with the arm supporting the cutting blade, and a lever provided with latch means connected to said shaft for adjusting said cam and retaining it in adjusted position to limit the cutting depth of the blade.

6. In a device of the class described, a carriage including blocks provided with opposed slots, a bed having ways slidably engaged by the slots of said blocks, a rod having its ends extending through said blocks, means for adjustably connecting the blocks to the rod for positioning the blocks in adjusted spaced apart relationship relatively to each other, bearing members, means for adjustably mounting the bearing members on said blocks, a shaft having its ends journaled in said bearing members, arms secured to said shaft, adjacent said bearing members, and pivotally mounted thereby relatively to the blocks, said arms being provided with longitudinally disposed bores opening outwardly of their upper free ends, supporting heads having depending shanks secured in said bores, a follower, having means for demountably and adjustably securing it in one of said heads and adapted to engage a revolving model, and a cutting bit, having means for adjustably and demountably securing it in the other head, and adapted to engage an article to be turned, said cutting bit being guided by the model.

7. A device as in claim 6, comprising contractile spring means for urging the follower supporting arm toward the model, a cam engaging the other arm, and an operator connected to said cam and provided with latch means for retaining the cam in adjusted position to limit the depth of said cutting bit.

BERNARD E. CUMMINGS.